Jan. 25, 1949.  E. C. POLLARD  2,459,961
WINDROW LIFTER AND TURNER
Filed Sept. 23, 1946
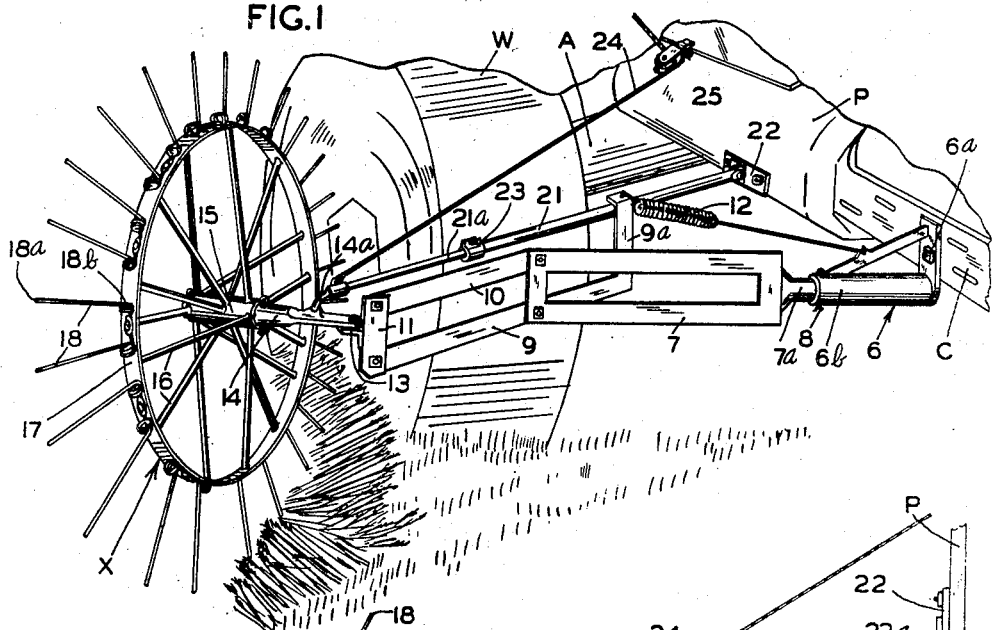
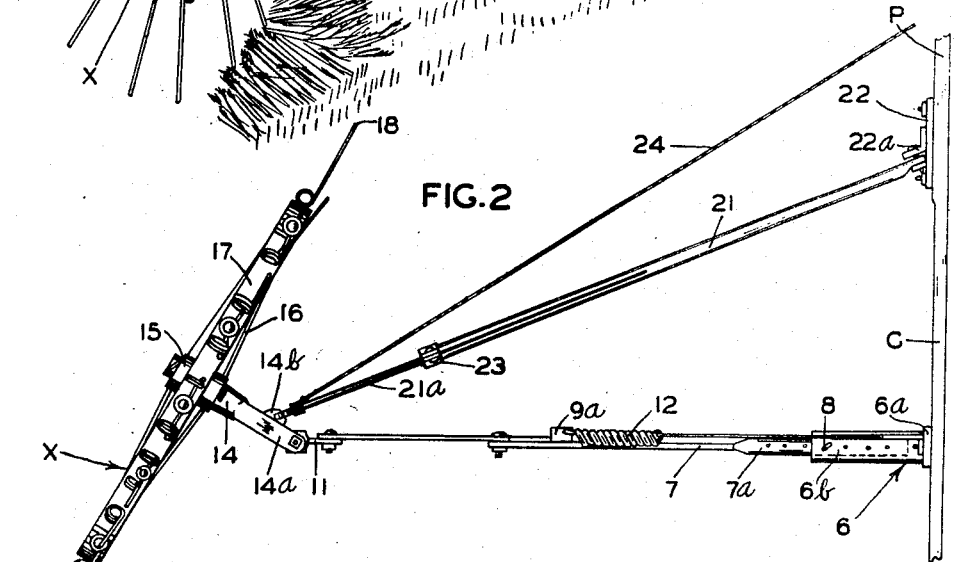
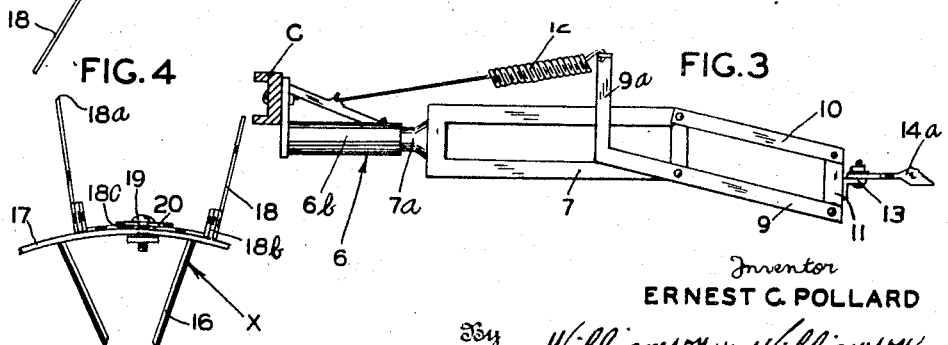
Inventor
ERNEST C. POLLARD
By Williamson & Williamson
Attorneys Patented Jan. 25, 1949

2,459,961

UNITED STATES PATENT OFFICE 2,459,961

WINDROW LIFTER AND TURNER

Ernest C. Pollard, Welcome, Minn.

Application September 23, 1946, Serial No. 698,798

10 Claims. (Cl. 56—372)

This invention relates to devices for lifting and turning the stalks of grain and other plant growths which have been previously cut in the field and formed into windrows.

In the modern harvesting of small grain, soy beans and other farm products, the stalks are cut in the field by a swather or cutter and are simultaneously bunched into windrows extending longitudinally of the cutting operations. These windrows, when the grain or other products is cut, lie for the most part, above the short stubble left in the ground and are subsequently picked up, threshed or harvested by so-called "combines" or other modern harvesting machines, which often do not make provision for cutting the grain. It is desirable to allow the grain, soy bean stalks, hay or other farm products, to lie or age for several days before harvesting in order that the grain or other food seeds may mature and properly dry. Rain, wind and gravity cause the cut stalks in the windrow to settle and often to become matted and wet, interfering with the proper drying and maturity of the seeds which are to be utilized as food and furthermore, disposing a considerable proportion of the windrow below the top of the stubble and the level at which the harvesting machines or combines pick up.

To prevent the grain or other food products from being adversely affected by moisture and to lift the stalks above the top of the stubble, these windrows often have to be turned, which at the present time, is generally accomplished by a side delivery rake. The action of such a rake threshes out a considerable proportion of the grain seeds and material losses occur when a windrow is so lifted or turned.

It is an object of my present invention to provide a highly simplified, efficient mechanism adapted to quickly and gently lift and turn the windrows through trailing movement of a toothed wheel set in a vertical plane disposed at an angle to its travelling movement.

A further object is the provision of a simple, efficient and comparatively inexpensive windrow turning device adapted to be mounted as an attachment upon the chassis of a tractor or other farm vehicle and extending from one side thereof and driven through trailing revolution of a wheel.

More specifically, it is an object to provide a windrow turning device which is particularly adapted as an attachment for a tractor or other vehicle and which utilizes a floating mounting extended laterally from one side of a tractor or other vehicle and supported thereby and having at its outer end an angularly disposed vertical lifting wheel adapted to trail upon the ground and be revolved through such trailing action and equipped with radially disposed spring teeth for engaging the stalks of the crop to lift and turn the windrow.

These and other objects and advantages of my invention will be more apparent from the following description made in connection with the accompanying drawings wherein like reference characters refer to similar parts throughout the several views and in which:

Fig. 1 is a perspective view showing an embodiment of my invention applied to a conventional type of tractor.

Fig. 2 is a top plan view of my windrow turner.

Fig. 3 is a rear elevation of the main portion of the floating mounting; and

Fig. 4 is a detail side elevation of a fragment of the lifting wheel showing the construction and attachment of the spring teeth.

In the drawings, my windrow turner is illustrated as attached to one of the sides of a conventional tractor which is provided with the usual longitudinal frame channels C, the usual large rear traction wheels W and rear axle housing A. The chassis frame includes a heavy, cast side plate P extending rearwardly of the frame channels C and in the embodiment illustrated, furnishing a supporting medium for a bracket to which a swingable brace arm is pivotally connected.

My improved mechanism includes a large spring toothed wheel indicated as an entirety by the letter X disposed in substantially vertical position but in a general plane at an acute angle to the line of travel of the vehicle and supported by a floating mounting which is secured to the tractor chassis.

The mounting, as shown, comprises a front socket bracket 6 having a vertical attachment base 6a which is rigidly bolted to one of the longitudinal frame channels C at a point several feet in advance of the rear axle housing A. Bracket 6 has the outwardly projecting, heavy, horizontal socket 6b, which extends substantially perpendicularly to the frame channel C and which receives telescopically, the enlarged, straight shank 7a of an outwardly projecting, rectangular mounting plate 7. Plate 7 projects in substantially straight line horizontal direction from the socket 6b and shank 7a and may be constructed from a pair of parallel, longitudinal bars interconnected by short, vertical bars to form a rectangular frame. The shank 7a is adjustably fixed in socket 6b by such means as a cotter pin 8 which is passed through one of a series of longitudinally spaced apertures in the socket 6b and through a diametric aperture formed in shank 7a.

Swingably connected with the outer end of the rigid mounting plate 7 is a floating, parallelogram frame as shown, consisting in an elongated lower lever arm 9, a shorter, parallel, upper arm 10 and a vertical end plate 11 pivotally connected at its ends with the outer ends of arms 9 and 10 and connecting said arms for swinging in parallelogram relation. The inner end of upper arm 10 is pivotally connected to the upper and outer corner of mounting plate 7 and the medial portion of the lower lever arm 9 is pivoted to the lower outer corner of plate 7. Said pivotal connections are in parallelogram relationship with the pivotal connections of the arms with the vertical plate 11. Lever arm 9 terminates at its inner end, in an upturned, bell crank arm 9a which at its upper extremity is connected by a counterbalancing coil spring 12 with the mounting bracket 6.

The floating parallelogram frame carries at its outer end, a spindle mounting bracket 13 which, as shown, is welded or otherwise rigidly affixed to the vertical plate 11 and has an upper, horizontal flange or web to which the inner tongue 14a of a horizontal wheel spindle or wheel-supporting arm 14, is pivotally connected for swinging on a substantially vertical axis. Spindle 14 constituting the outer part or portion of the support mounting has journaled thereon, the hub 15 of toothed wheel X and this hub in the form of wheel illustrated, is interconnected by rod spokes 16 with the annular rim 17 of the wheel. The rim utilized is in the form of an annular metal band having a series of circumferentially spaced apertures therein to facilitate attachment of the spring teeth. The spring teeth constituting resilient lifting elements, as shown, are integrally formed and connected to the wheel in pairs although it will of course, be understood that any suitable structure of spring tooth and attachment thereof, may be utilized within the scope of my invention provided that such teeth have outer extremities arranged radially of the wheel and disposed substantially within a concentric circle. The pairs of spring teeth shown, each comprises two radially extending rods 18 having blunt or rounded outer extremities 18a and integrally formed at their inner ends with one or more coil spring convolutions 18b. The convolutions 18b of a pair of teeth are interconnected by a short section of the wire or rod member, to form at the intermediate portion an eye 18c which is clamped to the rim of the wheel by a clamping bolt 19 provided with a clamping collar or plate 20.

To brace the floating mounting of the wheel against rearward, lateral strain in the traveling of the tractor and to determine and adjust the angular relation of the wheel with the line of travel, I provide a diagonal brace beam consisting, as shown, in inner and outer telescoping sections 21 and 21a respectively. The inner section 21 is of tubular construction and is pivotally connected at its inner extremity to spaced lugs 22a provided by a small attachment bracket 22 which is bolted to a rigid portion of the tractor chassis such as the side plate P substantially at the level of and two or three feet rearwardly of the attachment of mounting bracket 6. The pivotal connection of tubular brace section 21 with bracket 22 is such that the diagonal brace may swing upwardly substantially in a vertical plane. The outer section 21a of the diagonal brace may be of tubular or rod-like construction, is adjustably telescoped within the tubular inner section 21 and may be clamped thereto in the desired adjusted position by a suitable clamping collar 23. The outer extremity of brace section 21a, as illustrated, is angularly curved downwardly and loosely connected with a lug 14b carried by the tongue of the wheel spindle to make provision for swinging of the diagonal brace in substantially a vertical plane and also angular adjustment of the spindle 14 relatively to the floating mounting frame comprising parts 9, 10 and 11.

The wheel X is thus mounted for floating action relatively to the tractor chassis and the tension of the counterbalancing spring 12 is such as to overcome the greater part of the leverage effect of the weight of the wheel and its related parts including the floating parallelogram frame and the diagonal brace comprising members 21 and 21a, leaving however, sufficient overbalance in the wheel to cause the outer ends of the teeth to lightly engage against the ground when the device is in operation.

Means may be provided for lifting the wheel some distance above its operative engagement with the ground when desired, and as exemplary of such means, a rope or other flexible element 24 may be attached at its outer end to a lug provided near the outer end of frame section 21a, said flexible element being passed over a pulley 25 mounted appropriately on the rear portion of the chassis, the free end of the flexible element being directed rearwardly for pulling action by the driver or operator whereafter, the rope may be made fast by a loop or other attachment means to a lug or bolt near the driver's seat.

When my windrow turner is attached upon a tractor or other vehicle, the mounting bracket 6 is first secured to the frame or chassis at a point say from three to four feet forward of the axle of the rear wheels, socket 6b of the mounting bracket extending laterally outward, transversely of the supporting, longitudinal channel member C. The telescoping, diagonal brace comprising numbers 21 and 21a is then adjusted to determine the desired angulation of wheel spindle 14 relatively to the general plane of mounting plate 7 and the floating parallelogram frame, the desired angle being within a range of from thirty to forty-five degrees with respect to the main mounting which of course, disposed the wheel X in a plane extending or diverging forwardly from the line of travel of the tractor at a similar angle. The mounting bracket 22 for swingably connecting the inner end of the diagonal brace, is then affixed to the chassis of the tractor and the clamping collar 23 is of course, secured to rigidly join the sections 21 and 21a of the brace.

In operation with the teeth 18 of the wheel lightly engaging the ground, the wheel is trailed at an angle to the line of travel to the tractor and is caused by engagement of said teeth, to revolve in the same rotative direction as the tractor wheels. The vibration and resiliency of the spring teeth or lifting elements 18 prevent the teeth from collecting or adhering to the stalks of crops or clods of soil and also materially improve the lifting and stalk-turning functions of my device. The stalks of the windrow are successively engaged, lightly lifted rearwardly and in the direction of the tractor frame, by the successive action of spring teeth 18, the windrow thus being turned and the stalks lifted and somewhat spread apart during this action. The foot-per-minute travel of the periphery of the toothed wheel X is preferably slightly faster than the similar travel of the tractor wheels W but the reaction of lifting and turning through the functioning of spring teeth 18, is gentle and will not "ted" or shred the material, but reproduces the natural lifting action of the human hand. There is, consequently, no violent agitation of the stalks or grain and very little separation of the grain from the stalks in turning the windrow.

From the foregoing description, it will be seen that I have provided an extremely simple, highly efficient mechanism, particularly adapted as an attachment for farm vehicles such as tractors, for turning and lifting the windrows of crops in an efficient and gentle manner.

The floating mounting for the wheel X enables the wheel in trailing relation, to always conform to the contour of the ground, thereby assuring the proper functioning of the lifting teeth. The swingable or floating mounting in combination with the partial counter-balancing spring 12, maintains the degree of pressure essential to the revolution of wheel X through engagement of the teeth with the ground in the travel of the vehicle.

The device comprises few parts, is adapted to be very quickly and easily attached to a tractor or other vehicle and may be manufactured very economically.

It will of course, be understood that various changes may be made in the form, details, arrangement and proportions of the parts without departing from the scope of my invention.

What I claim is:

1. A windrow lifter and turner including a mobile frame, a support mounting for a freely rotatable lifting and turning wheel attached to said frame and extending therefrom, the support being secured to the frame for vertical movement with respect thereto, and having a part thereof extending at an angle with respect to the support mounting and the line of travel of the frame, a freely rotatable lifting and turning wheel mounted in a vertical plane on said angularly disposed part of said support mounting and thereby disposing the wheel in an erect plane relative to the ground and at an acute angle to the line of travel of said mobile frame, so that when the frame with the wheel so disposed and engaging the ground is moved and any obstructions are encountered by the said wheel, it and the support therefor will both move vertically either upwardly or downwardly and the stalks of cut crops on the ground over which the frame moves are lifted and turned by the wheel.

2. A windrow lifter and turner including a frame adapted to be attached to a mobile vehicle, a support mounting for a freely rotatable lifting and turning wheel secured to said frame and extending therefrom, the support mounting being secured to the frame for vertical movement with respect thereto and having an outer portion thereof constituting a wheel journal and extending at an angle with respect to the frame and the line of travel of the vehicle, a freely rotatable lifting and turning wheel mounted in a vertical plane on said angularly disposed outer portion of said support mounting, thereby disposing the wheel in an erect plane relative to the ground and at an acute angle to the line of travel of the vehicle so that when the frame with the wheel so disposed and engaging the ground is moved and any obstructions are encountered by the said wheel, it and the support therefor will both move vertically either upwardly or downwardly and the stalks of cut crops on the ground over which the frame moves are lifted and turned by the wheel.

3. A windrow lifter and turner including a mobile frame, a support mounting for a freely rotatable lifting and turning wheel attached to said frame and extending therefrom, the support being secured to the frame for vertical movement with respect thereto, and having a part thereof extending at an angle with respect to the support mounting and the line of travel of the frame, a freely rotatable lifting and turning wheel having a series of circumferentially spaced radially extending lifting and turning elements at the periphery thereof, said wheel being mounted in a vertical plane on said angularly disposed part of said support mounting and thereby disposing the wheel in an erect plane relative to the ground and at an acute angle to the line of travel of said mobile frame, so that when the frame with the wheel so disposed and engaging the ground is moved and any obstructions are encountered by the said wheel, it and the support therefor will both move vertically either upwardly or downwardly and the stalks of cut crops on the ground over which the frame moves are lifted and turned by the wheel.

4. A windrow lifter and turner including a frame adapted to be attached to a mobile vehicle, a support mounting for a freely rotatable lifting and turning wheel secured to said frame and extending therefrom, the support mounting being secured to the frame for vertical movement with respect thereto and having an outer portion thereof constituting a wheel journal and extending at an angle with respect to the frame and the line of travel of the vehicle, a freely rotatable lifting and turning wheel having a series of circumferentially spaced radially extending lifting and turning elements at the periphery thereof, said wheel being mounted in a vertical plane on said angularly disposed outer portion of said support mounting, thereby disposing the wheel in an erect plane relative to the ground and at an acute angle to the line of travel of the vehicle, and means incorporated in said support mounting for at least partially counterbalancing the weight of said wheel and said portion so that when the frame with the wheel so disposed and engaging the ground is moved and any obstructions are encountered by the said wheel, it and the support therefor will both move vertically either upwardly or downwardly and the stalks of cut crops on the ground over which the frame moves are lifted and turned by the wheel.

5. A windrow lifter and turner as set forth in claim 12 wherein said lifting elements are resilient and are mounted in spaced pairs extending circumferentially on said wheel and comprise for each pair, two spaced, generally radially extending rods, integrally formed at their inner ends with coil spring convolutions, said convolutions extending circumferentially of the wheel.

6. A windrow lifter and turner including a frame adapted to be attached to a mobile vehicle, a support mounting for a freely rotatable lifting and turning wheel secured to said frame and extending therefrom, the support mounting being secured to the frame for vertical movement with respect thereto and having an outer portion thereof constituting a wheel journal and extending at an angle with respect to the frame and the line of travel of the vehicle, a freely rotatable lifting and turning wheel mounted in a vertical plane on said angularly disposed outer portion of said support mounting, thereby disposing the wheel in an erect plane relative to the ground and at an acute angle to the lineo f travel of the vehicle, adjustable bracing means extending between said angularly disposed outer portion and said vehicle and adapted to be secured to said vehicle at a point spaced from the point of attachment of said frame, and counterbalancing means incorporated in said support mounting for at least partially counterbalancing the weight of said angularly disposed outer portion and said wheel so that when the frame with the wheel so disposed and engaging the ground is moved and any obstructions are encountered by the said wheel, it and the support therefor will both move vertically either upwardly or downwardly and the stalks of cut crops on the ground over which the frame moves are lifted and turned by the wheel.

7. A windrow lifter and turner including a frame for attachment to a vehicle, including a hollow socket, a substantially rectangular mounting plate having means at one side thereof to adjustably mount the same within said hollow socket, said mounting plate extending substantially in a straight line horizontal direction from the socket, a parallelogram linkage comprising an elongated lower lever arm, a shorter upper lever arm parallel to the lower arm, a vertical outer plate pivotally connected to the outer ends of both of said lever arms, the inner end of the upper arm being pivotally connected to the upper corner of said rectangular mounting plate, the medial portion of the lower lever arm being pivotally connected to the lower corner of said mounting plate, the inner end of the lower lever arm having a vertically disposed bell crank arm extending therefrom, a counter-balancing spring connected between said vertically disposed bell crank and said hollow socket, a horizontally disposed wheel spindle pivotally secured to said vertical outer plate, a freely rotatable wheel journaled on said spindle, said wheel having a multiplicity of circumferentially spaced lifting and turning elements extending outwardly therefrom, an adjustable bracing rod extending between said spindle and the vehicle and attached thereto at a point spaced from the point of attachment of said hollow socket, and means connected between said spindle and the vehicle for selectively elevating the spindle and the wheel carried thereby out of contact with the ground, the counter-balancing spring and the parallelogram linkage cooperating to provide a floating mounting for the wheel so that in normal operation the wheel is rotated solely through the contact of the lifting and turning elements with the ground and the wheel automatically follows the ground contour.

8. A windrow lifter and turner including a frame adapted to be attached to a mobile vehicle, a support mounting for a freely rotatable lifting and turning wheel secured to said frame and extending therefrom, the support mounting being secured to the frame for vertical movement with respect thereto and having an outer portion thereof constituting a wheel journal and extending at an angle with respect to the frame and the line of travel of the vehicle, a freely rotatable lifting and turning wheel having a series of circumferentially spaced radially extending lifting and turning elements at the periphery thereof, said wheel being mounted in a vertical plane on said angularly disposed outer portion of said support mounting, thereby disposing the wheel in an erect plane relative to the ground and at an acute angle to the line of travel of the vehicle, means incorporated in said support mounting for at least partially counterbalancing the weight of said wheel and said portion so that when the frame with the wheel so disposed and engaging the ground is moved and any obstructions are encountered by the said wheel, it and the support therefor will both move vertically either upwardly or downwardly and the stalks of cut crops on the ground over which the frame moves are lifted and turned by the wheel, and means connected with said angularly disposed outer portion for optionally elevating the same and the wheel and thus the lifting elements carried by the wheel out of contact with the ground.

9. A windrow lifter and turner including a mobile frame, a support mounting for a freely rotatable lifting and turning wheel attached to said frame and extending therefrom and including a rectangular plate, a parallelogram linkage secured to and extending from said plate and vertically movable with respect thereto, a wheel supporting and journaling arm secured to said parallelogram linkage and extending at an angle with respect thereto and thus at an angle with respect to the line of travel of the frame, a freely rotatable lifting and turning wheel having a series of circumferentially spaced radially extending lifting and turning elements mounted at the periphery thereof, said wheel being mounted in a vertical plane on said arm and thereby disposed in an erect plane relative to the ground at an acute angle to the line of travel of said mobile frame, counter-balancing means connected to said parallelogram linkage for at least partially counterbalancing the weight of said arm and said wheel so that when the frame with the wheel so disposed and engaging the ground is moved and any obstructions are encountered by said wheel, it and the support therefor will both move vertically either upwardly or downwardly and the stalks of cut crops on the ground over which the frame moves are lifted and turned by the wheel.

10. A windrow lifter and turner including a frame adapted to be attached to a vehicle, a support mounting attached to said frame and extending therefrom and being secured thereto for vertical movement with respect thereto, a horizontally disposed wheel journal arm pivotally secured to said support mounting for pivotal movement about a vertical axis, adjustable bracing means secured between said arm and said vehicle to dispose and maintain said arm at a selective angle with respect to the support mounting, a freely rotatable lifting and turning wheel having a series of circumferentially spaced radially extending lifting and turning elements on the periphery thereof, said wheel being journaled on said arm in a vertical plane and thereby disposed in an erect plane relative to the ground and at a selected angle to the line of travel of said vehicle, counter-balancing means secured to said